United States Patent
Van Patten Benhase et al.

(10) Patent No.: US 7,814,071 B2
(45) Date of Patent: Oct. 12, 2010

(54) APPARATUS, SYSTEM, AND METHOD FOR MAINTAINING DYNAMIC PERSISTENT DATA

(75) Inventors: Linda Van Patten Benhase, Tucson, AZ (US); Jason James Graves, Morrisville, NC (US); Robert Akira Kubo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 11/765,299

(22) Filed: Jun. 19, 2007

(65) Prior Publication Data

US 2008/0320058 A1 Dec. 25, 2008

(51) Int. Cl.
*G06F 17/00* (2006.01)
(52) U.S. Cl. .................................... 707/687
(58) Field of Classification Search .................. 707/687
See application file for complete search history.

(56) References Cited

U.S. PATENT DOCUMENTS

| | | | |
|---|---|---|---|
| 6,542,929 B1 | 4/2003 | Briskey et al. ............. 709/223 |
| 2001/0044793 A1 | 11/2001 | Ellsworth et al. ............. 707/3 |
| 2002/0001395 A1* | 1/2002 | Davis et al. ................. 382/100 |
| 2003/0126144 A1* | 7/2003 | O'Halloran et al. ......... 707/100 |
| 2003/0187927 A1 | 10/2003 | Winchell ..................... 709/204 |
| 2004/0220932 A1* | 11/2004 | Seeger et al. .................... 707/8 |
| 2004/0249946 A1 | 12/2004 | Jacobs et al. ................ 709/225 |
| 2005/0086236 A1 | 4/2005 | Chang ........................ 707/100 |
| 2005/0246376 A1* | 11/2005 | Lu et al. .................. 707/104.1 |
| 2005/0283579 A1 | 12/2005 | De Jong et al. ............. 711/154 |
| 2006/0095830 A1* | 5/2006 | Krishna et al. .............. 715/500 |
| 2006/0112096 A1* | 5/2006 | Ahluwalia et al. ............. 707/6 |
| 2006/0282471 A1* | 12/2006 | Mark et al. ................. 707/200 |
| 2007/0124116 A1* | 5/2007 | Liu et al. .................... 702/189 |
| 2007/0266047 A1* | 11/2007 | Cortes et al. ............. 707/104.1 |
| 2007/0266252 A1* | 11/2007 | Davis et al. ................. 713/176 |
| 2008/0016076 A1* | 1/2008 | Seeger et al. .................... 707/8 |
| 2008/0195583 A1* | 8/2008 | Hsu et al. ....................... 707/3 |
| 2009/0043830 A1* | 2/2009 | Lu et al. ..................... 707/204 |

OTHER PUBLICATIONS

Rangarajan et al., "A Fault-Tolerant Algorithm for Replicated Data Management", *Data Engineering, 1992. Proceedings, Eighth International Conference*, pp. 230-237.

Kumar, "Hierarchical Quorum Consensus: A New Algorithm for Managing Replicated Data", Computers, IEEE Transactions vol. 40, Issue 9, pp. 996-1004 Date: Sep. 1991.

Mays et al., "A Persistent Store for Large Shared Knowledge Bases", Kowledge and Data Engineering, IEEE Transactions, vol. 3, Issue 1, pp. 33-41 Date: Mar. 1991.

(Continued)

*Primary Examiner*—Charles Rones
*Assistant Examiner*—Kurt Mueller
(74) *Attorney, Agent, or Firm*—Kunzler Needham Massey & Thorpe

(57) ABSTRACT

An apparatus, system, and method are disclosed for maintaining dynamic persistent data. A selection module selects the most recent metadata. A verification module verifies that the metadata has been successfully updated. A validation module validates that the metadata is accurate. A communication module communicates the Persistent Storage Device data to a system processor if the metadata is validated. A storage module may store primary and secondary information of data, metadata, and data state variables.

20 Claims, 8 Drawing Sheets

OTHER PUBLICATIONS

Deris et al., "Replicated Data Management for Transactions Sharing in Distributed Database", High Performance Computing in the Asia-Pacific: Region, 2000. Proceedings, Fourth International Conference/Exhibition, vol. 2, 4-17, pp. 836-841 vol. 2 Date May 2000.

Nettles, "Sidney and RDS: an evaluation of two persistent storage systems", Performance, Computing and Communications Conference, 1999. IPCCC '99, IEEE International, 10-12, pp. 337-343, Date: Feb. 1999.

Shin et al., "Alternative majority-voting methods for real-time computing systems", Reliability, IEEE Transactions, vol. 38, Issue 1, pp. 58-64, Date: Apr. 1989.

Agrawal et all, "Analysis of Quorum-Based Protocols for Distributed (k+1)-Exclusion", *Parallel and Distributed Systems, IEEE Transactions*, vol. 8, Issue 5, pp. 533-537, Date: May 1997.

* cited by examiner

APPARATUS, SYSTEM, AND METHOD FOR MAINTAINING DYNAMIC PERSISTENT DATA

BACKGROUND OF THE INVENTION

1. Field of the Invention

This invention relates to persistent data and more particularly relates to maintaining dynamic persistent data.

2. Description of the Related Art

Mission critical data processing devices such as high-availability hard disk drive arrays often employ one or more redundant elements to eliminate single points of failure. For example, a high-availability hard disk drive array may include two controller cards. Each controller card may be configured to access all of the hard disk drives in the array. Thus if a first controller card failed, a second controller card could continue to provide access to the hard disk drive array.

Some data processing device elements may not have redundant counterparts. For example, a backplane may be considered passive and so not require a redundant counterpart.

Data such as configuration data may be stored in a plurality of service controller card non-volatile storage devices (NSD). If the data in a first service controller card NSD may become corrupted, the data may be retrieved from a second service controller card NSD.

Unfortunately, it may be difficult to determine whether the first service controller card NSD data or the second service controller card NSD data is corrupted. As a result, three or more copies of the data may be stored. For example, in addition to the service controller card NSD, one or more backplane NSD may store the data. The backplane NSD data may be compared with the data from the first and second service controller card NSD data. The data instance stored in a quorum of devices such as three devices may be considered valid data.

One or more backplane NSD may be embodied in a backplane. Periodically, the data stored in the backplane NSD and service controller card NSD may need to be updated. Unfortunately, updating the data may temporarily make it impossible to determine which instance of data is valid from a quorum of the service controller card NSD and backplane NSD.

SUMMARY OF THE INVENTION

From the foregoing discussion, there is a need for an apparatus, system, and method that maintains dynamic persistent data. Beneficially, such an apparatus, system, and method would identify and store the most current data.

The present invention has been developed in response to the present state of the art, and in particular, in response to the problems and needs in the art that have not yet been fully solved by currently available persistent data storage methods. Accordingly, the present invention has been developed to provide an apparatus, system, and method for maintaining dynamic persistent data that overcome many or all of the above-discussed shortcomings in the art.

The apparatus to maintain dynamic persistent data is provided with a plurality of modules configured to functionally execute the steps of storing metadata, selecting the most recent metadata stored, verifying the current metadata, validating the current metadata, communicating the most current metadata to a system processor. These modules in the described embodiments include a selection module, a verification module, a validation module, and a communication module. The apparatus may also include a storage module.

The storage module may store a primary instance and a secondary instance of the data, the metadata, and a data state variable. The selection module selects a most recent metadata instance from metadata stored in a first service controller card non-volatile storage device (NSD) for the first service processor and a second service controller card NSD for a second service processor as current metadata. The verification module verifies the current metadata if a last update operation was successful and if a first backplane NSD participated in the last update operation. The validation module validates the current metadata with metadata from the first backplane NSD if the current metadata is verified. The communication module communicates backplane NSD data to a system processor if the current metadata is validated.

A system of the present invention is also presented to maintain dynamic persistent data. The system may be embodied in a data processing system that maintains dynamic persistent data in its most current state. In particular, the system, in one embodiment, includes a backplane, a first controller card, and a second controller card.

The backplane includes a first and second backplane NSD. The first controller card communicates with the backplane. The first controller card includes a system processor, a first service processor, and a first sevice controller card NSD. The first controller card further includes a selection module, a verification module, a validation module a communication module. The first controller card may also include a storage module. The second controller card communicates with the backplane. The second controller card includes a second system processor, a second service processor and a second service controller card NSD.

The selection module selects a most recent metadata instance from metadata stored in the first sevice controller card NSD for the first service processor and the second sevice controller card NSD for the second service processor as current metadata. The verification module verifies the current metadata if a last update operation was successful and the first backplane NSD participated in the last update operation. The validation module validates the current metadata with metadata from the first backplane NSD if the current metadata is verified. The communication module communicates backplane NSD data to the system processor if the current metadata is validated. The storage module stores a primary instance and a secondary instance of the data, the metadata, and a data state variable on the backplane NSD. In addition, the storage module employs the primary instance of the data, the metadata, and the data state variable if the current metadata is verified. The validation module validates the current metadata with the secondary metadata if the current metadata is not verified. The communication module communicates the secondary data to the system processor if the current metadata is validated. The system maintains dynamic persistent data, selecting and saving the most valid data to maintain data integrity.

A method of the present invention is also presented for maintaining dynamic persistent data. The method in the disclosed embodiments substantially includes the steps to carry out the functions presented above with respect to the operation of the described apparatus and system. In one embodiment, the method includes storing metadata, selecting the most recent metadata stored, verifying the current metadata, validating the current metadata, communicating the most current metadata to a system processor.

A selection module selects a most recent metadata instance from metadata stored in the first NSD for the first service processor and the second NSD for the second service processor as current metadata. A verification module verifies the current metadata if a last update operation was successful and the first PSD participated in the last update operation. A validation module validates the current metadata with metadata from the first PSD if the current metadata is verified. A communication module communicates PSD data to the system processor if the current metadata is validated. A storage module stores a primary instance and a secondary instance of the data, the metadata, and a data state variable on the PSD. In addition, a storage module employs the primary instance of the data, the metadata, and the data state variable if the current metadata is verified. A validation module validates the current metadata with the secondary metadata if the current metadata is not verified. A communication module communicates the secondary data to the system processor if the current metadata is validated. The method maintains dynamic persistent data, selecting and saving the most recent, uncorrupted data.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention maintains dynamic persistent data for computer systems. In addition, the present invention may retrieve older but more accurate/reliable data. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
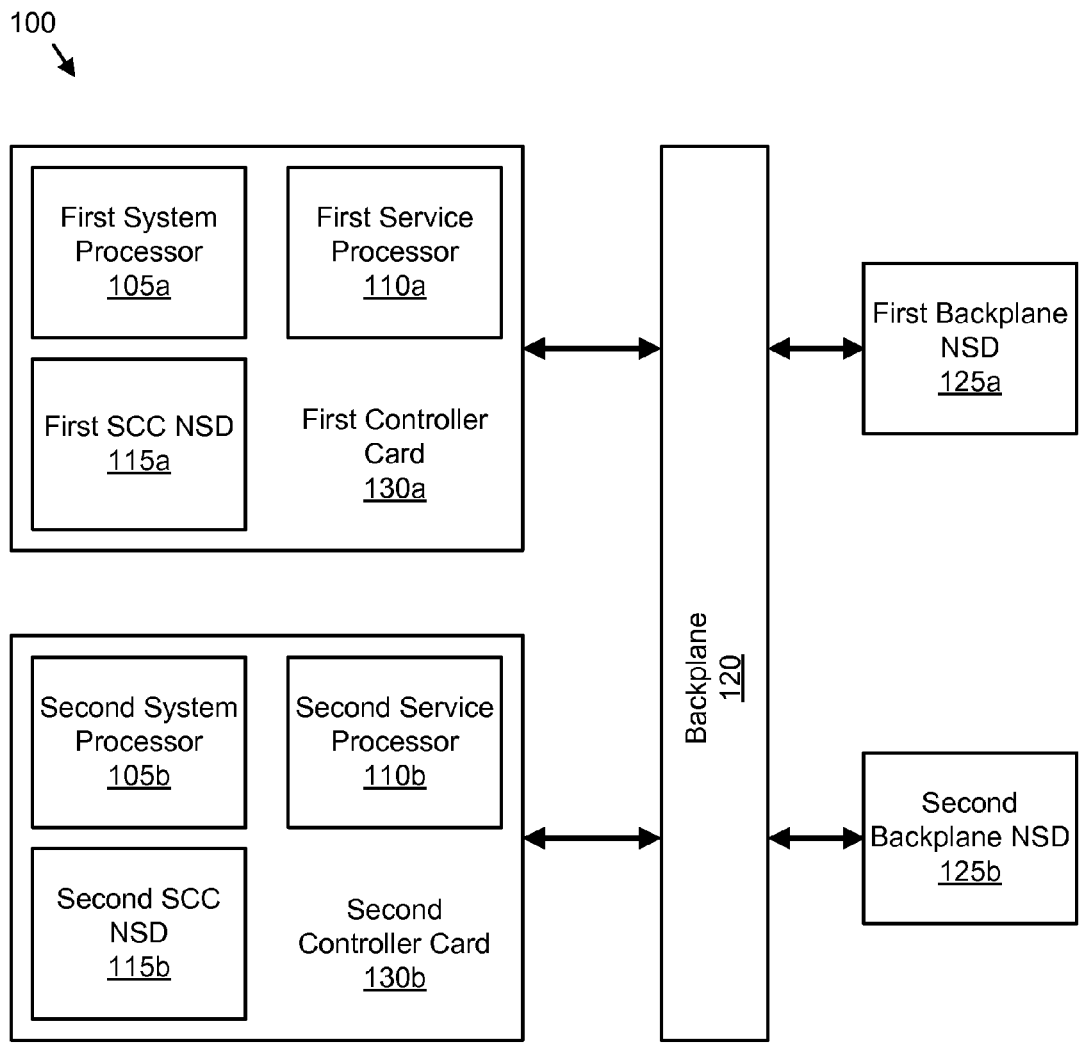
FIG. 1 is a schematic block diagram illustrating one embodiment of a redundant controller in accordance with the present invention.

FIG. 1 depicts a schematic block diagram illustrating one embodiment of a redundant controller 100 in accordance with the present invention. The redundant controller 100 is comprised of a first controller card 130a, a second controller card 130b, a backplane 120, a first backplane NSD 125a, and a second backplane NSD 125b. The first controller card 130a has a first system processor 105a, a first service processor 110a, and a firstservice controller card NSD 115a. The second controller card 130b has a second system processor 105b, a second service processor 110b, and a second service controller card NSD 115b.

Although for simplicity, one first controller card 130a, one second controller card 130b, one backplane 120, one first backplane NSD 125a, and one secondbackplane NSD 125b, one first system processor 105a, one first service processor 110a, one first service controller card NSD 115a, one second system processor 105b, one second service processor 110b, and one second service controller card NSD 115b are shown, any number of controller cards 130, backplanes 120, backplanes NSDs 125, system processors 105, service processors 110, and service controller card NSDs 115 may be employed.

The system processors 105a and 105b may manage a storage system for the controller cards 130a and 130b. The storage system may include a plurality of hard disk drives, optical storage devices, holographic storage devices, micromechanical storage devices, semiconductor storage devices, and the like. The system processors 105 may control the storage system through the backplane 120.

The first service processor 110a may perform service tasks such as updating the configuration information on the first service controller card NSD 115a, and the backplanes NSDs 125. Likewise the second service processor 110b may update the configuration information on the second service controller card NSD 115b, and the backplane NSDs 125. Configuration information may store number and types of disk drives, RAID (redundant array of independent disks) levels, parity encoding schemes and the like.

The controller cards 130a, 130b are redundant so that there is no single point of failure in the storage system. For example, the second controller card 130b may take over and access all disk drives should the first controller card 130a fail. It is important to have the correct configuration information and the copies of the configuration information may be of different instances and may not be the same. One cannot readily tell which copy is the correct instance of the configuration information. The redundant controller 100 may select the instance of the configuration information that is stored by a quorum of the service controller card NSDs 115, the first backplane NSD 125a, and the second backplane NSD 125b.

Figure 2A:
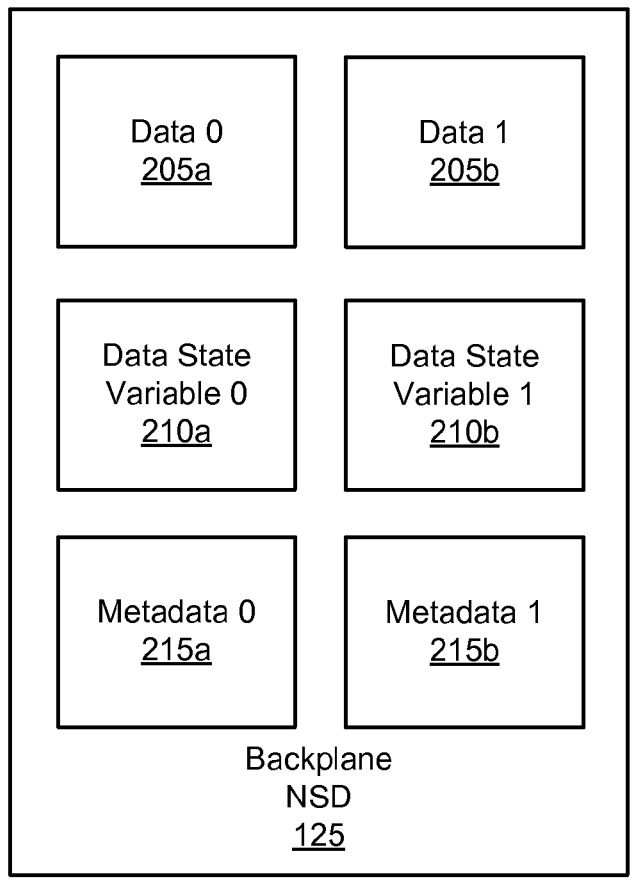
FIG. 2A is a schematic block diagram illustrating one embodiment of a backplane NSD of the present invention.

FIG. 2A depicts a schematic block diagram illustrating one embodiment of a backplane NSD 125 of the present invention. The backplane NSD 125 stores information instances and may be the PSD 125 of FIG. 1. The description of the backplane NSD 125 refers to elements of FIG. 1, like numbers referring to like elements. The backplane NSD 125 includes a data 0 205a, a data 1 205b, a data state variable 0 210a, a data state variable 1 210b, metadata 0 215a, and a metadata 1 215b. The backplane NSD 125 may comprise one or more data storing devices such as flash memory in the redundant controller 100. Although the data 205, data state variables 210, and metadata 215 are shown for the backplane NSD 125, the service controller card NSD 115 and other devices may also store the data 205, data state variables 210, and metadata 215.

Data 0 205a, data state variable 0 210a, and metadata 0 215a may comprise primary information while data 1 205b, data state variable 1 210b, and metadata 1 215b may comprise secondary information. The data 205 stores configuration information. For example, the data 205 could store information on multiple data storing disk drive types and on RAID levels.

The data state variable 210 stores information on the condition of the data. For example, the data 0 205a may be in the process of being updated. The data state variable 0 210a may be set to a binary code of '1' or open to show that the data is being updated, locking out other accesses to the backplane NSD 125.

Figure 2B:
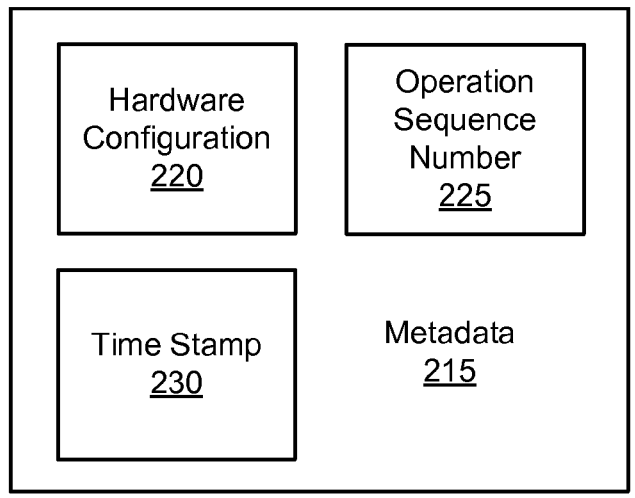
FIG. 2B is a schematic block diagram illustrating one embodiment of metadata of the present invention.

FIG. 2B depicts a schematic block diagram illustrating one embodiment of a metadata 215 of the present invention. The description of the metadata 215 refers to elements presented above with respect to the operation of the described backplane NSD 125 and elements of FIGS. 2A and 1. The metadata 215 can include a hardware configuration 220, an operation sequence number 225, and a time stamp 230. For example, the metadata 215 may store data about the data 205. The hardware configuration 220 may specify a current configuration of the control cards 130, the configuration of the backplane 120, and the like. The operation sequence number 225 may record the sequence that an update operation was performed, assigning a number to each operation. For example, the data 0 205a may finish the process of being stored and the metadata 215 stores an operation sequence number of '762' and a time stamp 230 recording a time of update completion for the data 0 205a.

Figure 3:
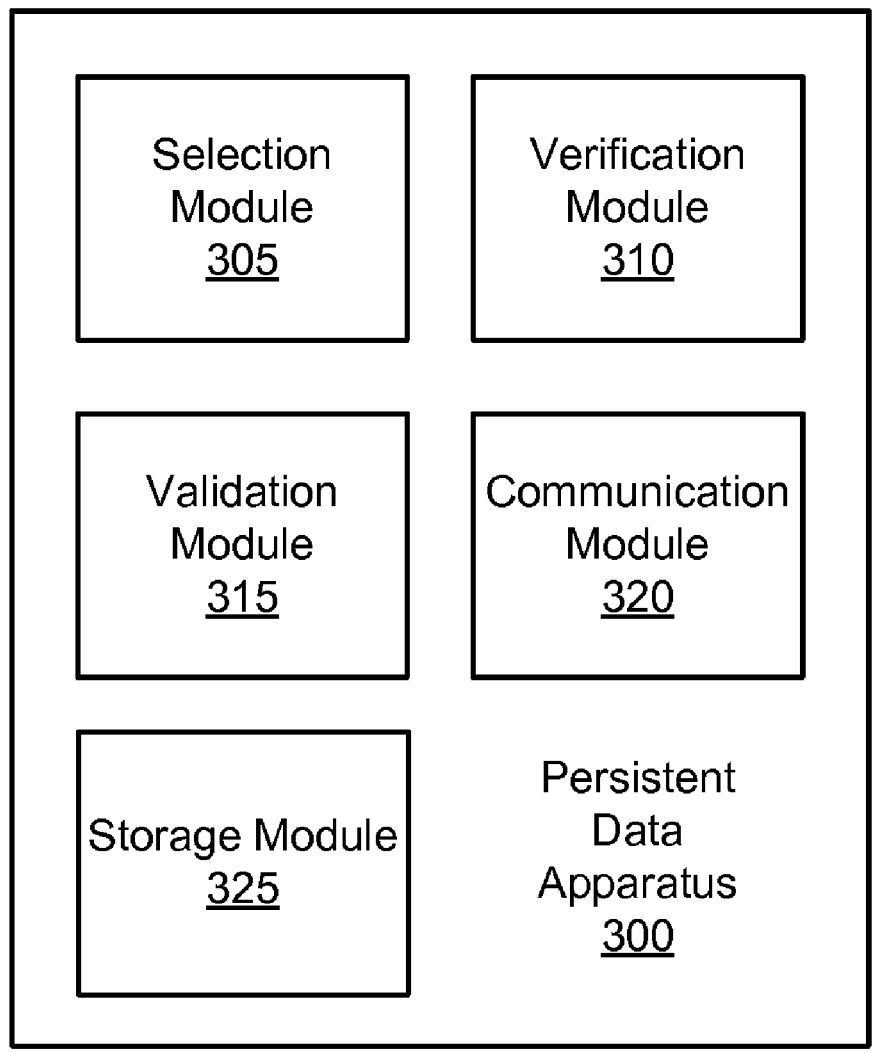
FIG. 3 is a schematic block diagram illustrating one embodiment of a persistent data apparatus of the present invention.

FIG. 3 depicts a schematic block diagram illustrating one embodiment of a persistent data apparatus 300 of the present invention. The apparatus 300 maintains dynamic persistent data and can be embodied in the backplane NSD 125 and redundant controllers 100 of FIGS. 2B, 2A, and 1, like numbers referring to like elements. The apparatus 300, which may operate on the first controller card 130a, includes a selection module 305, a verification module 310, a validation module 315, a communication module 320, and a storage module 325. The selection module 305, verification module 310, validation module 315, communication module 320, and storage module 325 may comprise one or more computer readable programs executing on the first service processor 110a.

The selection module 305 selects a most recent metadata instance from metadata 215 stored in the first service controller card NSD 115a for the first service processor 110a and the second service controller card NSD 115b for the second service processor 110b as current metadata. For example, the selection module 305 may receive a command from the computer program operating on the first system processor 105a to retrieve the configuration data after an event such as a power failure and to select the most current metadata.

The verification module 310 verifies the current metadata if a last update Operation was successful and the first backplane NSD 125a participated in the last update operation. For example, a data state variable 210 may be a binary '0' or closed, indicating a successful update and the time stamp 230 of the first backplane NSD 125a may show that the first backplane NSD 125a participated in the same update operation as the current metadata.

The validation module 315 validates the current metadata with metadata 215 from the first backplane NSD 125a if the current metadata is verified. For example, the validation module 315 may perform a byte-by-byte comparison of the metadata 215 from the firstbackplane NSD 125a with the current metadata and validate the current metadata if each pair of bytes compared are the same.

The communication module 320 communicates the backplane NSD data 205 to a system processor 105 if the current metadata 215 is validated. For example, the communication module 320 may send the first backplane NSD data 0 205a to the first system processor 105a to be used as the data 205 to run the redundant controller 100. The storage module 325 stores the primary instance and the secondary instance of the data 205, the metadata 215, and the data state variable 210 on the service controller card NSD 115 and backplane NSD 125 as will be described hereafter.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4A:
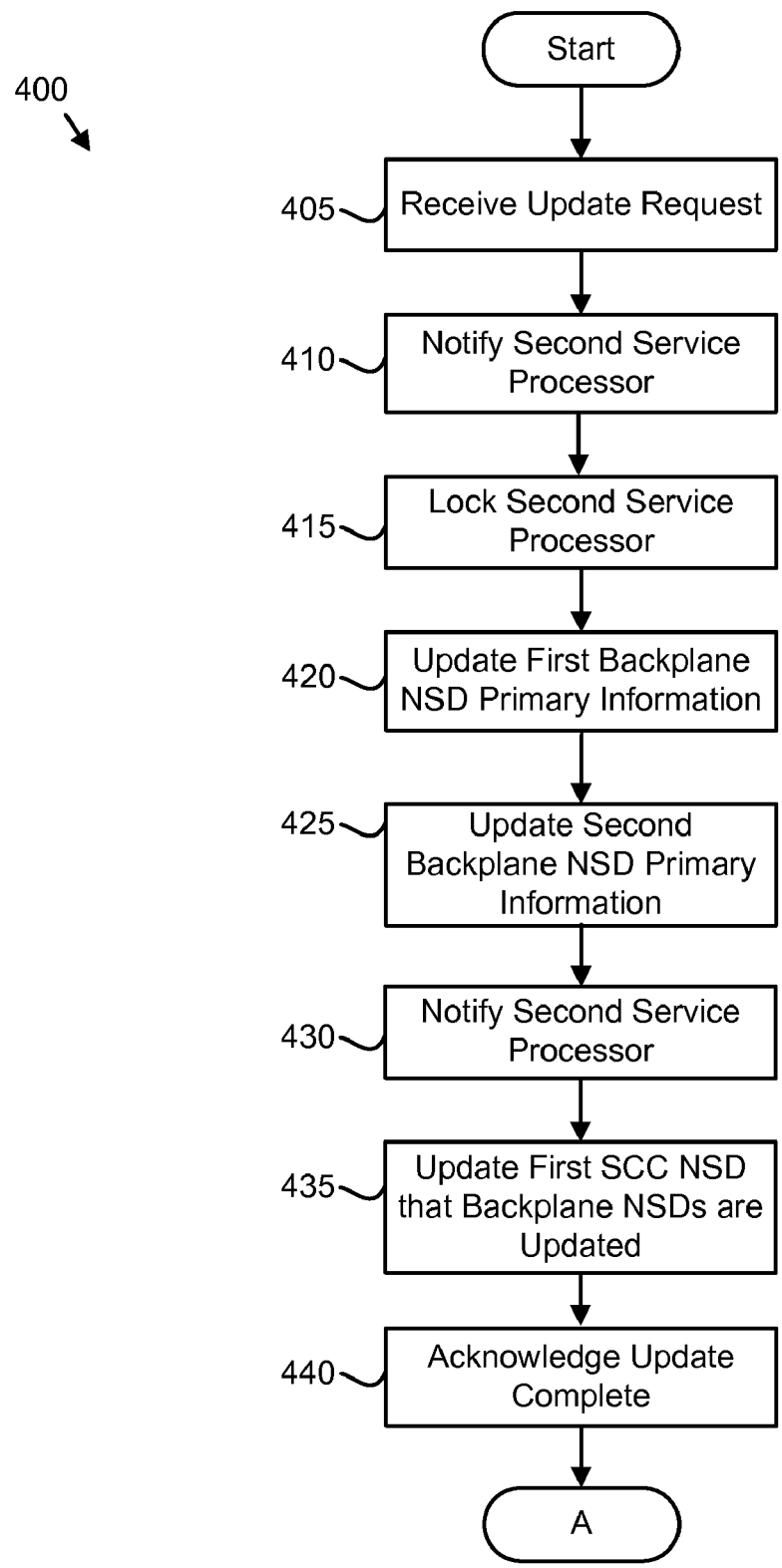
FIGS. 4A and 4B include a schematic flow diagram illustrating one embodiment of a data updating method of the present invention.
Figure 4B:
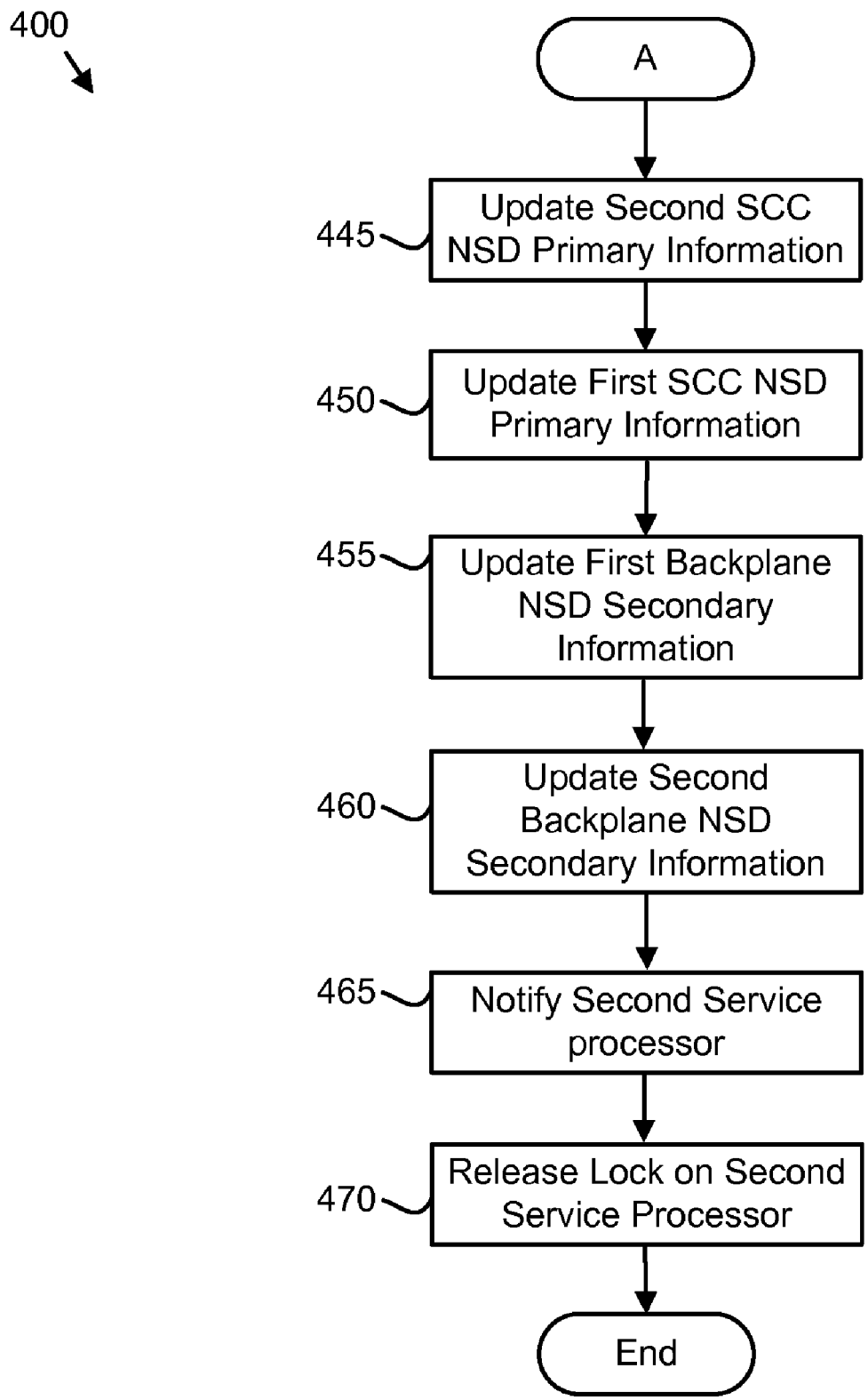

FIGS. 4A and 4B depicts a schematic flow diagram illustrating one embodiment of a data updating method 400 of the present invention. The method 400 substantially includes the steps to carry out the functions presented above with respect to the operation of the described apparatus 300, the metadata 215, the backplane NSD 125 and the redundant controller 100 of FIGS. 3, 2B, 2A and 1 respectively. The description of method 400 refers to elements of FIGS. 1-3, like numbering referring to like elements. In one embodiment, the method 400 is implemented with a computer program product comprising a computer readable medium having a computer readable program. The computer readable program may be executed by the first service processor 110a.

The method 400 begins, and in an embodiment, the storage module 325 receives 405 the update request. The update request may be communicated by a computer program executing on the first system processor 105a that has met one of several possible criteria including a hardware change, a time passed since last update, a prescheduled update time, and/or a volume of data processed since last update. Alternatively, an authorized person may request the update.

In one embodiment, the update request can be initiated because a regularly scheduled time has passed. For example, the first service processor 110a may receive 405 an update request because it is 1:00 am.

The storage module 325 notifies 410 the second service processor 110b of an impending update. For example, the storage module 325 may notify the second service processor 110b that a preset volume of data has been processed and the storage module 325 will soon start updating by communicating a message over the backplane 120.

The storage module 325 locks 415 the second service processor 110b. For example, the storage module 325 may write a specified lock value to a register of the second service processor 110b.

The storage module 325 updates 420 the first backplane NSD's primary information. For example, data 205, a data state variable 210, and metadata 215 may be transferred to the first backplane NSD 125a and stored as the data 0 205a, the data state variable 0 210a, and the metadata 0 215a.

The storage module 325 updates 425 the second backplane NSD's primary information. For example, the data 205, the data state variable 210, and the metadata 215 may be transferred to the second backplane NSD 125b and stored as the data 1 205b, the data state variable 1 210b, and the metadata 1 215b.

The storage module 325 notifies 430 the second service processor 110b that The primary information of the first and second backplane NSD 125a, 125b are updated. For example, the second service processor 110b may perform a function until the information is recorded as updated. Notification of the update may act as a step to unlocking the second service processor 110b.

The storage module 325 updates 435 the first service controller card NSD 115a that the backplane NSDs 125 are updated. For example, the storage module 325 may write a time stamp value to a specified address of the first service controller card NSD 115a, wherein the time stamp value indicates that the backplane NSD 125 are updated. Updating the service controller card NSD 115a may give a base line that the information being received has not been backed up.

The storage module 325 acknowledges 440 the updates of the backplane NSD 125 are complete. For example, the storage module 325 may acknowledge the update by communicating a message to the first system processor 105a.

Continuing the method 400 with FIG. 4B, the storage module 325 updates 445 the primary information of the second service controller card NSD 115b. For example, the storage module 325 may overwrite the older primary information in the second service controller card NSD 115b with the updated information. Alternatively, the storage module 325 may overwrite the secondary information and designate the older primary information as secondary information.

The storage module 325 updates 450 the primary information of the first service controller card NSD 115a. For example, the storage module 325 may overwrite the older primary information in the first service controller card NSD 115a with the updated information. Alternatively, the storage module 325 may overwrite the secondary information and designate the older primary information as secondary information. In an alternate example, the storage module 325 may write the new metadata that has been received since the last update to the first service controller card NSD 115a.

The storage module 325 updates 455 the first backplane NSD secondary information. For example, the storage module 325 may overwrite the older secondary information in the first backplane NSD 125a and designate the older primary information as secondary information.

The storage module 325 updates 460 the second backplane NSD secondary information. For example, the storage module 325 may overwrite the older secondary information in the second backplane NSD 125b and designate the older primary information as secondary information.

The storage module 325 notifies 465 the second service processor 110b that the secondary information of the first and second backplane NSD 125a, 125b are updated. For example, the second service processor 110b may perform a function until the storage module 325 communicates a message that the backplane NSDs 125 are updated. Notification of the update may act as a step to unlocking the second service processor 110b.

The storage module 325 releases 470 the lock on the second service processor 110b. The storage module 325 may release the lock by writing a null value to a register of the second service processor 110b.

Figure 5:
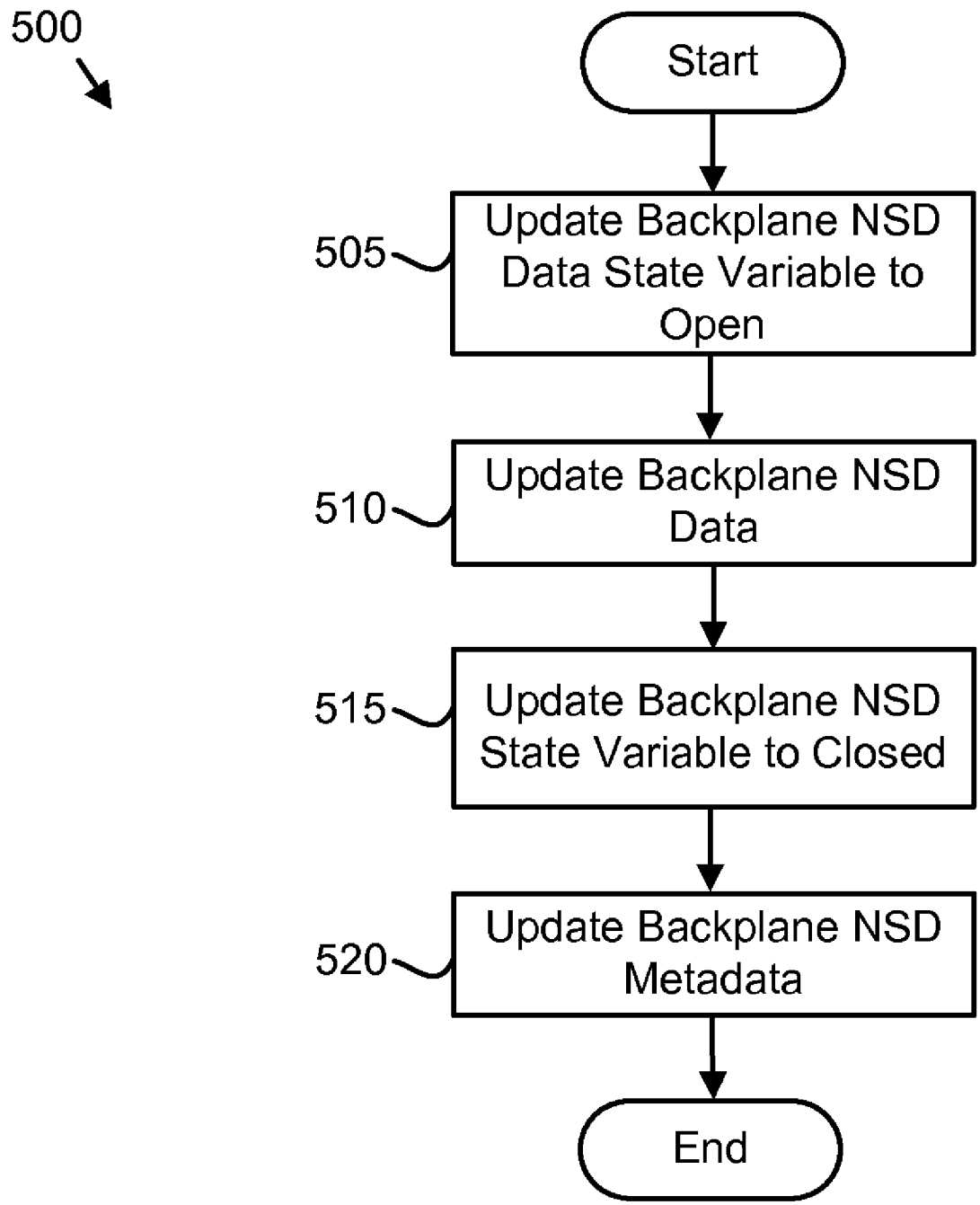
FIG. 5 is a schematic flow chart diagram illustrating one embodiment of an updating method of the present invention.

FIG. 5 depicts a schematic flow chart diagram illustrating one embodiment of an updating method 500 of the present invention. The method 500 substantially includes the steps to carry out the functions presented above with respect to steps 420, 425, 455, and 460 of the described method 400. The description of method 500 refers to elements of FIGS. 1-4, like numbers referring to like elements respectively. In one embodiment, the method 500 is implemented with a computer program product comprising a computer readable medium having a computer readable program. The computer readable program may be executed by the first service processor 110a.

The method 500 begins, and in an embodiment, the storage module 325 updates 505 the backplane NSD data state variable 210 to open. For example, prior to updating data, the storage module 325 may write an open value such as a binary '1' to set the data state variable 210. The data state variable 210 set to open may inform other programs that the backplane NSD 125 will be unavailable due to the data updating.

The storage module 325 updates 510 the backplane NSD data. For example, the storage module 325 may write an update such as data 205 and/or metadata 215 to the backplane NSD 125 after recognizing that the data state variable is open.

The storage module 325 updates 515 the backplane NSD data state variable 210 to closed. For example, the storage module 325 may finish writing the backplane NSD data update and protect the data by locking access to the data. In one embodiment, setting the backplane NSD data sate variable to closed may secure access to the backplane NSD data 205.

The storage module 325 updates 520 the backplane NSD metadata 215. For example, the storage module 325 may write a time stamp 230 and operation sequence number 225 to the metadata to designate the most recent update is completed.

Figure 6A:
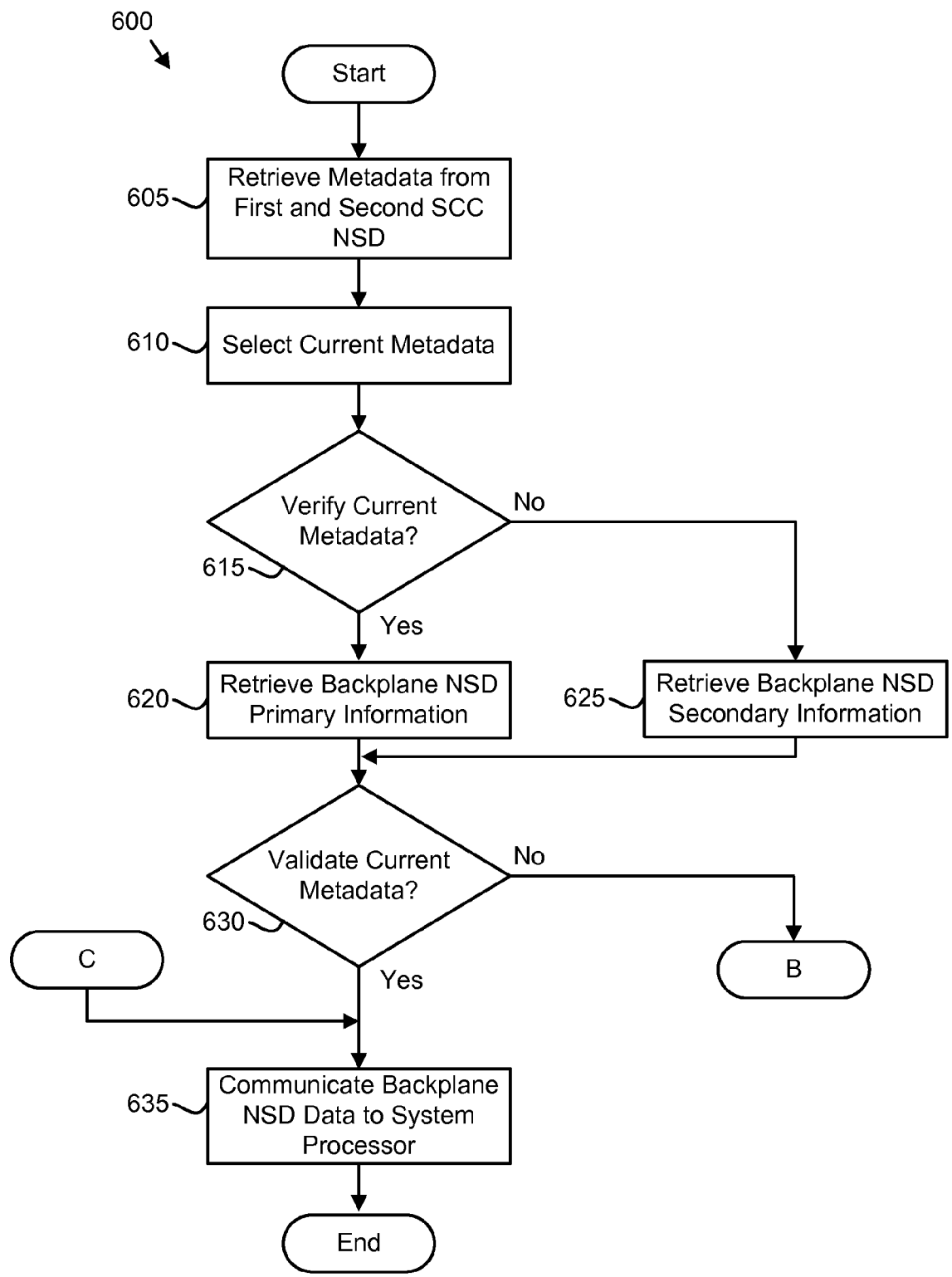
FIGS. 6A and 6B include a schematic flow chart diagram illustrating one embodiment of a validating method of the present invention.
Figure 6B:
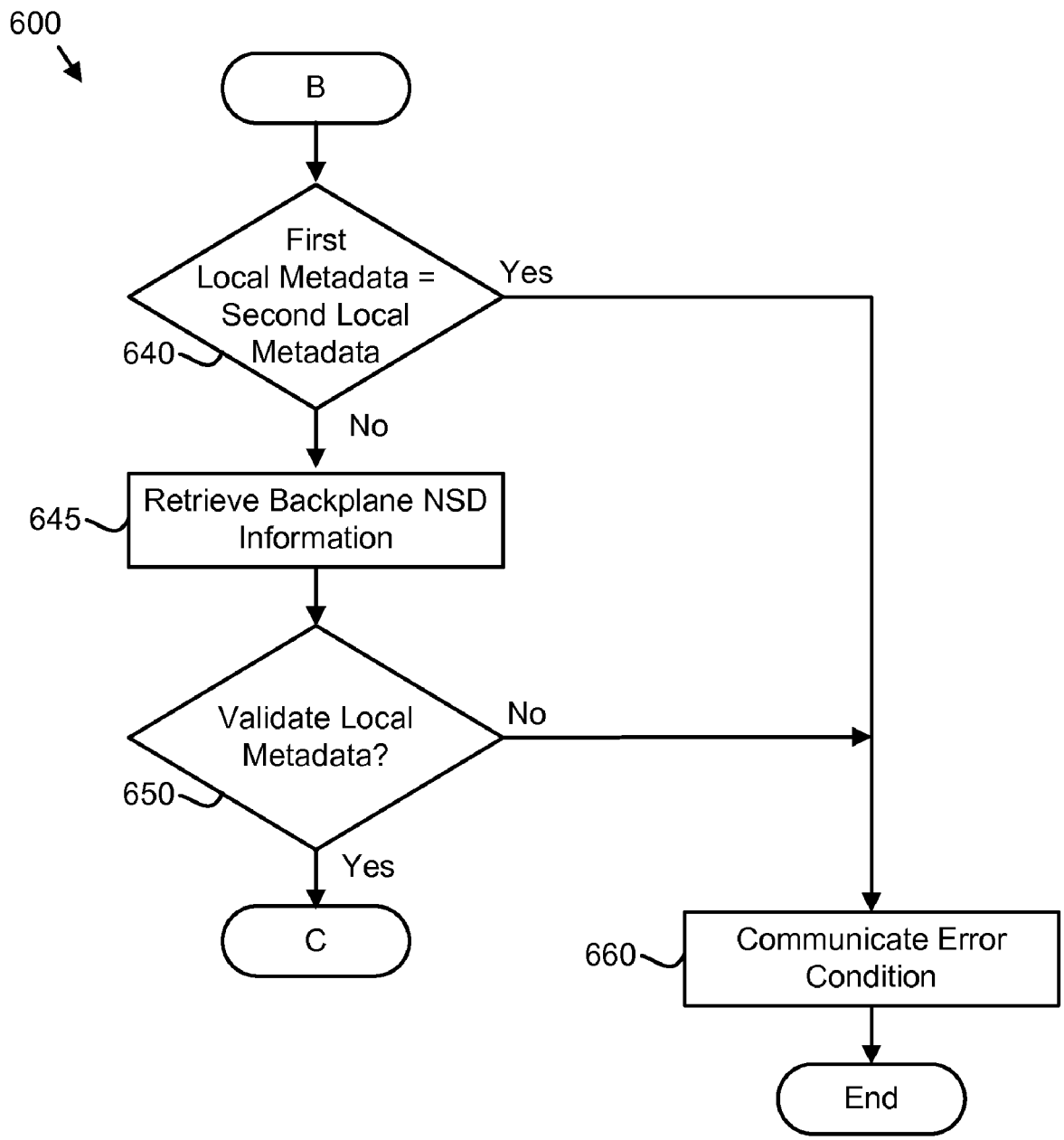

FIGS. 6A and 6B depicts a schematic flow chart diagram illustrating one embodiment of a validating method 600 of the present invention. The method 600 substantially includes the steps to carry out the functions presented above with respect to the operation of the described updating method 500, data updating method 400, apparatus 300, the metadata 215, the backplane NSD 125, and the redundant controller 100 of FIGS. 5, 4B, 4A, 3, 2B, 2A and 1 respectively. The description of method 600 refers to elements of FIGS. 1-5, like numbering referring to like elements respectively. In one embodiment, the method 600 is implemented with a computer program product comprising a computer readable medium having a computer readable program. The computer readable program may be executed by the first service processor 110a.

The method 600 begins, and in an embodiment, the storage module 325 retrieves 605 metadata from the first and second service controller card NSD 115a and 115b. For example, the service processor 110a may issue a command to retrieve the metadata during the validating process.

The first service processor 110a selects 610 the current metadata. For example, the service processor 110a may compare the metadata time stamps 230 for the first and second service controller card NSD 115a, 115b to determine which has the most recent time stamp 230, and select the most metadata with the most current time stamp 230. If the time stamps 230 for the first and second service controller card NSD 115a, 115b are equivalent, then either the first service controller card NSD 115a or the second service controller card NSD 115b may be selected.

The verification module 310 verifies 615 the current metadata if a last update operation was successful and a first backplane NSD PSD 125a participated in the last update operation. For example, the verification module 310 may verify 615 the current metadata is the data state variable 210 is closed and if the time stamp 230 of the first backplane NSD 125a is substantially equivalent to the current metadata.

In one embodiment, the time stamp 230 may show that primary information in the first backplane NSD 125a participated in the same update operation as the current metadata, verifying the current metadata. If the current data is verified, the storage module 325 may retrieve 620 the primary backplane NSD information including the data 0 205a, the metadata 0 215a, and the data state variable 0 210a.

If the current metadata is not verified, the storage module 325 may retrieve 625 the secondary backplane NSD information including the data 1 205a, the metadata 1 215a, and the data state variable 1 210a. In one embodiment, the validation module 315 validates 630 the current metadata. For example, the first service processor 110a may perform a byte-by-byte comparison of the current metadata with the selected primary or secondary metadata 215 from the first backplane NSD 125a. The information may be validated if each pair of bytes compared are the same and the communication module 320 communicates 635 the backplane NSD information to the first system processor 105a and the method 600 ends.

In one embodiment, the validation module 315 validates 630 the current metadata if a current metadata data state variable is closed and a backplane NSD operation sequence number 225 is equivalent to a current operation sequence number. In an alternate embodiment, the validation module 315 validates 630 the current metadata if a current data state variable is closed and a backplane NSD hardware configuration 220 is equivalent to a current hardware configuration.

If the validation module 315 determines 630 the information is not validated, the verification module 310 determines 640 if the first local metadata 215a retrieved from first service controller card NSD 115a and the second local metadata 215b retrieved from second service controller card NSD 115b are equivalent. For example, the verification module 310 may look at the time stamps 230 for the first local metadata 215a and the second local metadata 215b to determine if the metadata 215 are the same. If the first local metadata 215a and the second local metadata 215b are equivalent, the communication module 320 communicates 660 an error condition and the method 600 ends.

If the local metadata 215 are not the same, the storage module 325 retrieves 645 the first backplane NSD 125a information. In one embodiment the validation module 315 validates 650 the local metadata 215. The service processor 110a may perform a byte-by-byte comparison of the second local metadata 215b with the selected secondary metadata 215b from the first backplane NSD 125a. The information is validated if each pair of bytes compared are the same and the communication module 320 communicates 635 the backplane NSD data 205 to the system processor 105a and the method 600 ends. If the validation module 315 determines 650 the information is not validated, the communication module 320 communicates 660 an error condition and the method 600 ends. If the validation module 315 determines 650 the information is validated, the method 600 ends.

The present invention maintains dynamic persistent data for computer systems. In addition, the present invention may retrieve older but more accurate/reliable data. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for maintaining dynamic persistent data, the apparatus comprising:
   a memory storing executable code;
   a processor executing the executable code, the executable code comprising
   a selection module selecting a most recent metadata instance from metadata stored in a first service controller card non-volatile storage device (NSD) for a first service processor of a first service controller card and a second service controller card NSD for a second service processor of a second service controller card as current metadata;
   a verification module verifying the current metadata if a last update operation was successful and a first backplane NSD of a backplane participated in the last update operation;
   a validation module validating the current metadata with metadata from the first backplane NSD if the current metadata is verified; and
   a communication module communicating first backplane NSD data to a system processor if the current metadata is validated.

2. The apparatus of claim 1, further comprising a storage module storing a primary instance and a secondary instance of the data, the metadata, and a data state variable on the first backplane NSDs and employ the primary instance of the data, the metadata, the data state variable if the current metadata is verified else the validation module validates the current metadata with the secondary metadata if the current metadata is not verified and the communication module communicates the secondary data to the system processor if the current metadata is validated.

3. The apparatus of claim 2, the storage module further:
   locking the second service processor;
   updating the first backplane NSD primary information;
   updating primary information of a second backplane NSD;
   notifying the second service processor that the first and second backplane NSD primary information are updated;
   updating the first service controller card NSD that the first and second backplane NSD are updated;
   updating the first backplane NSD secondary information;
   updating the second backplane NSD secondary information; and
   releasing the lock on the second service processor.

4. The apparatus of claim 3, the storage module further updating backplane NSD information by:
   updating the backplane NSD data state variable to open;
   updating the backplane NSD data;
   updating the backplane NSD data state variable to closed; and
   updating the backplane NSD metadata.

5. The apparatus of claim 1, wherein each metadata instance comprises a data state variable and the validation module validates the current metadata if a current data state variable is closed and backplane NSD metadata is equivalent to the current metadata.

6. The apparatus of claim 5, wherein each metadata instance comprises a hardware configuration and the validation module validates the current metadata if a current data state variable is closed and a backplane NSD hardware configuration is equivalent to a current hardware configuration.

7. The apparatus of claim 5, wherein each metadata instance comprises an operation sequence number and the validation module validates the current metadata if a current metadata data state variable is closed and a backplane NSD operation sequence number is equivalent to a current operation sequence number.

8. A computer program product comprising a computer useable medium storing a computer readable program, wherein the computer readable program when executed on a computer causes the computer to:
   select a most recent metadata instance from metadata stored in a first service controller card non-volatile storage device (NSD) for a first service processor of a first service controller and a second service controller card NSD for a second service processor of a second service controller card as current metadata;
   verify the current metadata if a last update operation was successful and a first backplane NSD of a backplane participated in the last update operation;
   validate the current metadata with metadata from the first backplane NSD if the current metadata is verified; and
   communicate first backplane NSD data to a system processor if the current metadata is validated.

9. The computer program product of claim 8, the computer readable program further causing the computer to store a primary instance and a secondary instance of the data, the metadata, and a data state variable on the first backplane NSD and employ the primary instance of the data, the metadata, the data state variable if the current metadata is verified else to validate the current metadata with the secondary metadata if the current metadata is not verified and communicate the secondary data to the system processor if the current metadata is validated.

10. The computer program product of claim 9, the computer readable program further causing the computer to:
    lock the second service processor;
    update the first backplane NSD primary information;
    update primary information of a second backplane NSD;
    notify the second service processor that the first and second backplane NSD primary information are updated;
    update the first service controller card NSD that the first and second backplane NSD are updated;
    update the first backplane NSD secondary information;
    update the second backplane NSD secondary information; and
    release the lock on the second service processor.

11. The computer program product of claim 10, the computer readable program further causing the computer to update backplane NSD information by:
    updating the backplane NSD data state variable to open;
    updating the backplane NSD data;
    updating the backplane NSD data state variable to closed; and
    updating the backplane NSD metadata.

12. The computer program product of claim 11, wherein each metadata instance comprises a hardware configuration and the computer readable program further causes the computer to validate the current metadata if a current data state variable is closed and a backplane NSD hardware configuration is equivalent to a current hardware configuration.

13. The computer program product of claim 11, wherein each metadata instance comprises an operation sequence number and the computer readable program further causes the computer to validate the current metadata if a current metadata data state variable is closed and a backplane operation sequence number is equivalent to a current operation sequence number.

14. A system for maintaining dynamic persistent data, the system comprising:
    a backplane comprising a first and second backplane NSD;

a first controller card comprising a system processor, a first service processor, and a first service controller card non-volatile storage device (NSD), wherein the first controller card is in communication with the backplane;
a second controller card comprising a second system processor, a second service processor, and a second service controller card NSD, wherein the second controller card is in communication with the backplane;
the first controller card further comprising a computer readable program stored in a memory and executed on the first service processor, the computer readable program comprising
a selection module selecting a most recent metadata instance from metadata stored in the first service controller card NSD for the first service processor and the second service controller card NSD for the second service processor as current metadata;
a verification module verifying the current metadata if a last update operation was successful and the first backplane NSD participated in the last update operation;
a validation module validating the current metadata with metadata from the first backplane NSD if the current metadata is verified;
a communication module communicating first backplane NSD data to the system processor if the current metadata is validated; and
a storage module storing a primary instance and a secondary instance of the data, the metadata, and a data state variable on the first backplane NSD and employing the primary instance of the data, the metadata, the data state variable if the current metadata is verified else the validation module validates the current metadata with the secondary metadata if the current metadata is not verified and the communication module communicates the secondary data to the system processor if the current metadata is validated.

15. The system of claim 14, the storage module further:
locking the second service processor;
updating the first backplane NSD primary information;
updating primary information of a second backplane NSD;
notifying the second service processor that the first and second backplane NSD primary information are updated;
updating the first service controller card NSD that the first and second backplane NSD are updated;
updating the first backplane NSD secondary information;
updating the second backplane NSD secondary information; and
releasing the lock on the second service processor.

16. The system of claim 15, the storage module further updating backplane NSD information by:
updating the backplane NSD data state variable to open;
updating the backplane NSD data;
updating the backplane NSD data state variable to closed; and
updating the backplane NSD metadata.

17. The system of claim 16, wherein each metadata instance comprises a data state variable and the validation module validates the current metadata if a current data state variable is closed and backplane NSD metadata is equivalent to the current metadata.

18. The system of claim 17, wherein each metadata instance comprises a hardware configuration and the validation module validates the current metadata if a current data state variable is closed and a backplane NSD hardware configuration is equivalent to a current hardware configuration.

19. The system of claim 17, wherein each metadata instance comprises an operation sequence number and the validation module validates the current metadata if a current metadata data state variable is closed and a backplane NSD operation sequence number is equivalent to a current operation sequence number.

20. A method for deploying computer infrastructure, comprising integrating computer readable program into a computing system, wherein the program in combination with the computing system is capable of performing the following:
selecting a most recent metadata instance from metadata stored in a first service controller card non-volatile storage device (NSD) for a first service processor and a second service controller card NSD for a second service processor as current metadata;
verifying the current metadata if a last update operation was successful and a first backplane NSD disposed on a backplane participated in the last update operation;
validating the current metadata with metadata from the first backplane NSD of a backplane if the current metadata is verified;
communicating first backplane NSD data to a system processor if the current metadata is validated;
storing a primary instance and a secondary instance of the data, the metadata, and a data state variable on the first backplane NSD;
employing the primary instance of the data, the metadata, the data state variable if the current metadata is verified else validating the current metadata with the secondary metadata if the current metadata is not verified; and
communicating the secondary data to the system processor if the current metadata is validated.

* * * * *